US012013042B2

United States Patent
Rosa Brusin et al.

(10) Patent No.: US 12,013,042 B2
(45) Date of Patent: Jun. 18, 2024

(54) MULTIWAY VALVE WITH CARTRIDGE AND FLUID MECHANICS INSERTS

(71) Applicant: Giacomini S.p.A., San Maurizio d'Opaglio (IT)

(72) Inventors: Marco Rosa Brusin, San Maurizio d'Opaglio (IT); Paolo Arrus, San Maurizio d'Opaglio (IT); Samuele Molina, San Maurizio d'Opaglio (IT); Andrea Zuffellato, San Maurizio d'Opaglio (IT)

(73) Assignee: GIACOMINI S.P.A., Novara (IT)

( * ) Notice: Subject to any disclaimer, the term of this patent is extended or adjusted under 35 U.S.C. 154(b) by 178 days.

(21) Appl. No.: 17/422,507

(22) PCT Filed: Jan. 23, 2020

(86) PCT No.: PCT/IB2020/050528
§ 371 (c)(1),
(2) Date: Jul. 13, 2021

(87) PCT Pub. No.: WO2020/157612
PCT Pub. Date: Aug. 6, 2020

(65) Prior Publication Data
US 2022/0090691 A1  Mar. 24, 2022

(30) Foreign Application Priority Data

Jan. 28, 2019 (IT) .......................... 102019000001221

(51) Int. Cl.
*F16K 11/087* (2006.01)
*F16K 27/06* (2006.01)

(52) U.S. Cl.
CPC ........ *F16K 11/0873* (2013.01); *F16K 27/067* (2013.01)

(58) Field of Classification Search
CPC ........................... F16K 11/0873; F16K 11/076
See application file for complete search history.

(56) References Cited

U.S. PATENT DOCUMENTS

| 4,577,835 | A | 3/1986 | Holycross |
| 4,699,358 | A | 10/1987 | Iqbal |
| 9,677,717 | B2 * | 6/2017 | Jenks .................. F16K 11/0873 |

FOREIGN PATENT DOCUMENTS

| DE | 102015000424 B3 | 4/2016 |
| EP | 0289770 A2 | 11/1988 |

(Continued)

OTHER PUBLICATIONS

DE102015000424 Machine Translation (Year: 2015).*

(Continued)

*Primary Examiner* — Michael R Reid
(74) *Attorney, Agent, or Firm* — Mark Malek; Widerman Malek, PL

(57) ABSTRACT

A multiway valve that may include a generally cylindrical shaped hollow valve body having at least one handling opening and a plurality of through openings made on the outer wall of the valve body and defining a first group of connecting openings and a second group of connecting openings. A handling element may be pivotally disposed in the valve body and include at least two first through radial openings made on the outer wall of the cartridge. A tubular shaped fluid mechanics insert may be housed inside the cartridge, and may have a second radial opening to let a fluid flow. The fluid mechanics insert may also include a cell formed inside the cavity of the insert to define a homogeneous fluid flow rate.

14 Claims, 4 Drawing Sheets

(56) References Cited

FOREIGN PATENT DOCUMENTS

GB        821898  A    10/1959
WO    2018203288  A1   11/2018

OTHER PUBLICATIONS

International Search Report in related application PCT/IB2020/050528 dated Apr. 28, 2020; 5 pages.
Written Opinion in related application PCT/IB2020/050528 dated Apr. 28, 2020; 7 pages.

* cited by examiner

MULTIWAY VALVE WITH CARTRIDGE AND FLUID MECHANICS INSERTS

RELATED APPLICATIONS

This application is a national phase application of and claims priority under 35 U.S.C. § 371 of PCT Application No. PCT/IB2020/050528 filed on Jan. 23, 2020 and titled MULTIWAY VALVE WITH CARTRIDGE AND FLUID MECHANICS INSERTS, which claims the benefit of IT 102019000001221, filed on Jan. 28, 2019, each of which is hereby incorporated by reference in its entirety.

TECHNICAL FIELD

The present invention refers to a multiway valve with cartridge and fluid mechanics inserts.

More particularly, the present invention refers to a new technical approach to a multiway diverter hydraulic valve having at least one flow-diverting cartridge provided with fluid mechanics inserts, mainly used in hydronic and heating-cooling system plants.

STATE OF THE ART

The multiway valves are fluid-diverting valves commonly used in hydraulic and hydronic plants and adapted to selectively convey a fluid flow between two or more passageways.

These types of valves are typically used for connecting a fluid circuit of a user plant or section of a plant, alternatively and selectively, to different thermal sources or for insulating the same user circuit or section thereof from the plant or network.

In the remote distribution fluid circuits or public networks of hydronic or thermal plants for heating or cooling residential or industrial buildings, known also as "four pipes" circuits, diverter valves or "six way" (three plus three) valves are widely used, such valves being adapted to convey and control in the same circuit, the delivery and return of a fluid, alternatively, between a hot thermal source for heating or a "cool" thermal source for cooling, according to the requirements of an user.

Actually, many applications of said residential and industrial thermal hydronic plants, require some users or sections of the same plants to operate in a heating mode while others to simultaneously operate in a cooling mode. Using a six-way diverter valve attached to the ends of each user or (delivery and return) section of a hydronic plant enables to switch the same users or sections between the heating or cooling mode, independently from each other.

Some examples of multiway diverter valves used in the state of the art are the conventional six-way valves consisting, for example, in a combination of two simple three-way diverter valves, generally used in four-pipe plants for managing the same area with two different thermal sources.

A typical example of a six-way valve is described in the British patent GB 2138110; this document describes a valve obtained by coupling two (or more) diverter cartridges housed in a single valve body. The valve body comprises two triads of mouths located at the same level; each triad is provided with a respective diverter cartridge selectively connecting two mouths of the same triad, in order to enable for example to connect a mouth of each triad to a supplying conduit and the remaining two to two different discharging conduits.

In the same document, the diverter cartridges comprise a substantially spherical body in which a through inner "L" shaped passage for a fluid is made; the spherical body rotates inside the valve body and causes the inner through conduit to communicate with two of the three mouths, in order to obtain the above described operation.

A typical drawback of these traditional six-way valves is the requirement of reciprocally aligning the two spherical bodies and the return rod, which in turn requires a larger size in order to prevent and limit the operative positioning of the six-way valve in a constrained space condition. Another typical drawback of these conventional six-way valves arises from the presence of the return rod connecting the two spherical bodies and from the couplings between the same and the rod. Indeed, the operative wear can cause angular misalignments between the two spherical bodies which, in turn, can determine, during a switching step, different undesired angular positionings between the two spherical bodies (openings/closures) which decrease the valve efficiency and tightness.

In order to overcome these limits, the state of the art uses also small-sized multiway valves provided with a single cartridge tubular element having a partitioning septum in the inner part thereof and with a plurality of lateral openings placed at different levels. Said cartridge tubular element advantageously integrates the flow diverting function of both the diverting spherical members at the inlet and output of the user, by further eliminating the necessity of a connecting rod between the two sections, enabling a more longitudinally compact implementation of the valve and such to eliminate the limits caused by possible angular misalignments among the conduits of the spherical diverting members and ensuring a better adjustment accuracy required by the relevant regulations (European regulation). The conduits or openings of said adjusting members are indeed implemented on the mantle of the (generally cylindrical) tubular cartridge element, by simple through openings adapted to be put in rotation integrally with said tubular element without any possible misalignments.

A typical example of this type of six-way valve is described in the Italian patent application IT 201700010534 in the name of the same Applicant, and regarding a multiway valve comprising a valve body with a first and second diverter valves cooperating with each other and each provided with a first and second diverting members and with a triad of mouths opening in the valve body, wherein said multiway valve comprises a tubular cartridge integrating said first and second diverting members. The tubular cartridge is housed and movable inside the valve body and is provided with command members for causing said displacement.

Another example of a multiway valve is described in the German document DE 10 2015 000424 B3 referring to a rotary valve configured to changing the direction of several flows of a fluid in a heating and cooling system comprising inlet and outlet openings for the fluid, a cylindrical valve body rotatable about an axis of rotation, a valve housing which houses the cylindrical valve body, the valve housing having fluid outlet opening, several through channels extending through the valve body. Said valve body is designed with surface grooves which together with the inner wall of the housing, form further through channels with grooves arranged along said valve body.

Another more example is described in the International Application WO 2018/203288 A1 referring to a hydraulic connection unit for cooling and heating systems with a body in a single piece in which two respective communicating hollow ball shutters are arranged and equipped with different flows, which are operated from the outside by means of levers to be rotated in a plurality of positions to allow various operating conditions of the hydraulic unit so as to obtain a hydraulic unit of easy hermetic assembly and of reduced dimensions.

Other examples of this types of multiway valves are described in the prior art documents US 2011/0303863 A1, CN 2402891 Y and CN 103133444 A.

Another typical aspect of these known types of multiway or diverting valves is that the flow rates of a fluid thermal carrier entering and exiting the user, or a section of a hydronic or thermal plant and coming from two different sources, are generally different form each other in the heating operation and in the cooling operation. Consequently, when said valves are installed, they can be provided, at the inlet openings of the six-way valve, with known devices or means for statically or dynamically balancing the fluid flow rate, such as washers or rings provided with a calibrated hole having a size less than the one of the through cross-section of the standard valve openings. Said calibrated hole is adapted to generate localized load losses in order to allow the required fluid flow rate to enter the plant. These calibrated washers or rings can be mounted or assembled with the valve during the manufacturing, at the sleeves or hydraulic connecting elements or can be directly installed on the plant by a technician.

Another example of devices or means for statically or dynamically balancing the fluid flow rate is described in the European patent EP 3 201 500 (B1), in the name of the same Applicant, regarding a valve comprising means for adjusting the fluid static flow rate and adapted to vary the cross-section of a through port between the inlet and outlet of the valve, and dynamic flow rate balancing means adapted to adjust the flow rate of a fluid exiting the valve, as a function of a variation of the entering fluid flow rate.

The dynamic balancing means comprise a perforated element interposed between the inlet opening and an intermediate chamber in order to enable a fluid to flow only through at least one opening of the perforated element.

Moreover, an elastic element is placed at a face of the perforated element facing the fluid inlet opening in the valve body so that, an increase of a pressure difference between the valve inlet and outlet is matched by an enlargement of the elastic element in order to reduce the flow area of the at least one opening of the perforated element and to ensure a constant flow rate.

Unfortunately, also these known types of multiway valves or diverter valves provided with a single diverting cartridge element have some operative inconveniences and drawbacks.

A typical disadvantage of these multiway valves or diverter valves with diverting members integrated by a cartridge tubular element is due to the fact that the fluid through cross-sections inside the same cartridge element are not uniform and are provided with grooves having a cross-section much greater than the cross-sections of the through conduits or pipes.

These large grooves of the cartridge elements generate swirls in the moving confined flow, which decrease the fluid mechanics efficiency of the valve and can cause load losses, operative noise and sometimes cavitation phenomena.

Another drawback of these known types of valves arises from the fluid tightness and possible occurrences of leakages and fluid losses not only outwardly but also inside the valve itself consequently reciprocally contaminating the thermal sources of the fluids at different temperatures flowing through the valve.

A further limit of these types of valves is due to the fact that in the closed position, that is when the user circuit is completely isolated from the thermal sources, these valves do not enable to discharge, and vent possible fluid overpressures generated in the user hydraulic circuit.

OBJECTS OF THE INVENTION

The object of the present invention consists of at least partially overcoming and solving the operative inconveniences and drawbacks of the above discussed prior art. More particularly, it is an object of the present invention to implement a multiway valve with cartridge and fluid mechanics inserts, having an improved fluid mechanics efficiency and a homogeneous and laminar fluid flow through the through cross-sections of the diverting elements capable of limiting the generation of swirl phenomena and with a reduced operative noise.

A further object of the invention consists of implementing a multiway valve with cartridge and fluid mechanics inserts having a reduced size.

A further object of the invention consists of implementing a multiway valve with cartridge and fluid mechanics inserts being provided with all the adjusting functions required to the operation of a so-called "four pipes" plant.

A further object of the invention consists of implementing a multiway valve without mechanical angular misalignments and clearances among the diverting members of each triad and which is at least less subjected to wear and corrosion phenomena.

Last but not least object of the present invention consists of providing a multiway valve with cartridge and fluid mechanics inserts having an improved fluid tightness and with reduced leakages and losses, in order to meet the requirements enacted by the respective international regulations.

A still further object of the present invention consists of providing a multiway valve with cartridge and fluid mechanics inserts capable of ensuring a high level of extended strength and reliability, which can be further easily and economically implementable.

These and other objects are met by the multiway valve with cartridge and fluid mechanics inserts object of the present invention according to the independent claim.

The structural and operative characteristics of the multiway valve with cartridge and fluid mechanics inserts can be better understood from the detailed following description, in which it is made reference to the attached drawings illustrating a preferred non-limiting embodiment, wherein:

DETAILED DESCRIPTION OF THE INVENTION

Figure 1:
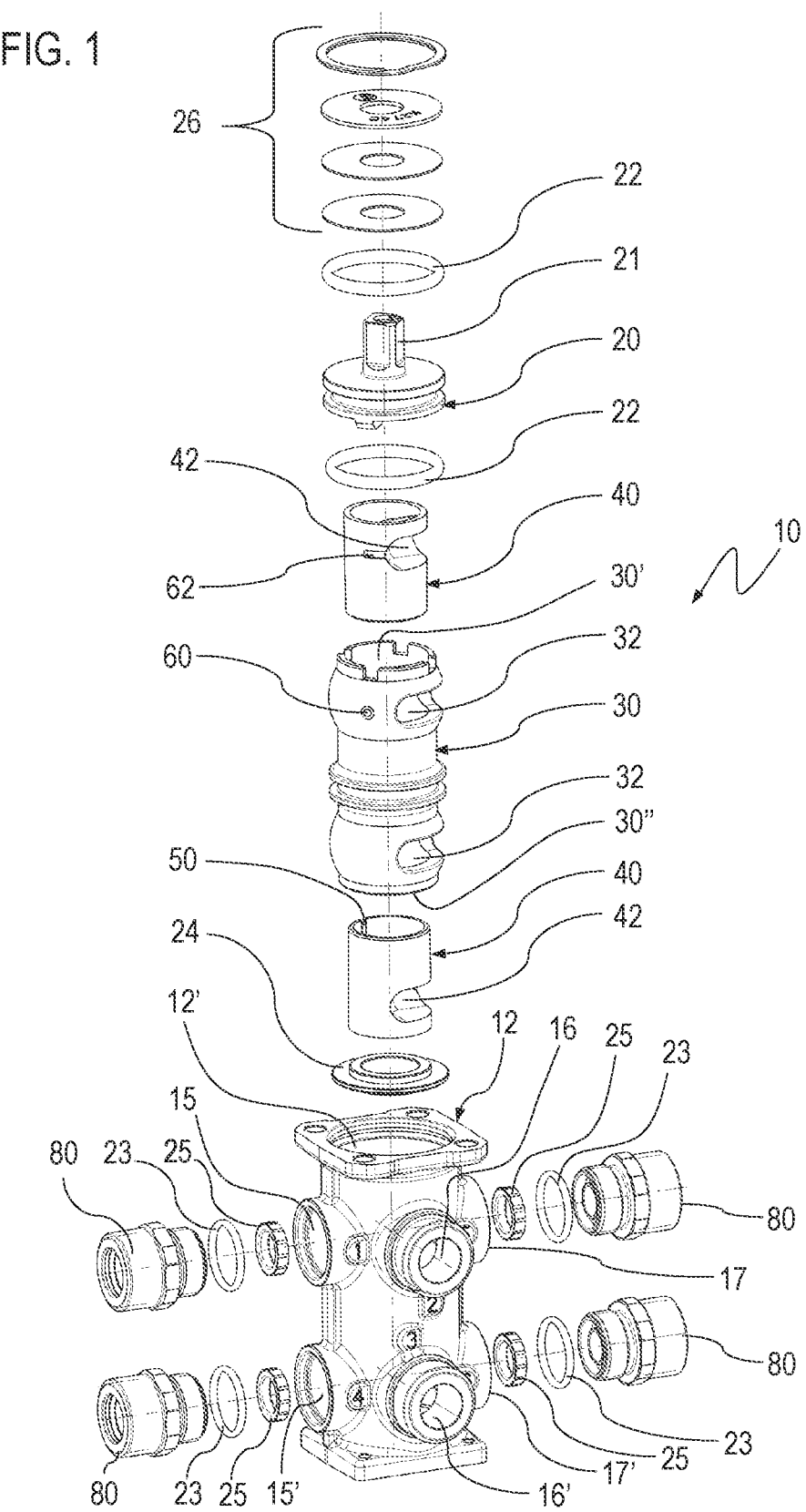
FIG. 1 is a schematic illustration of an overall axonometric exploded view of a preferred embodiment of the multiway valve with cartridge and fluid mechanics inserts object of the present invention.
Figure 2:
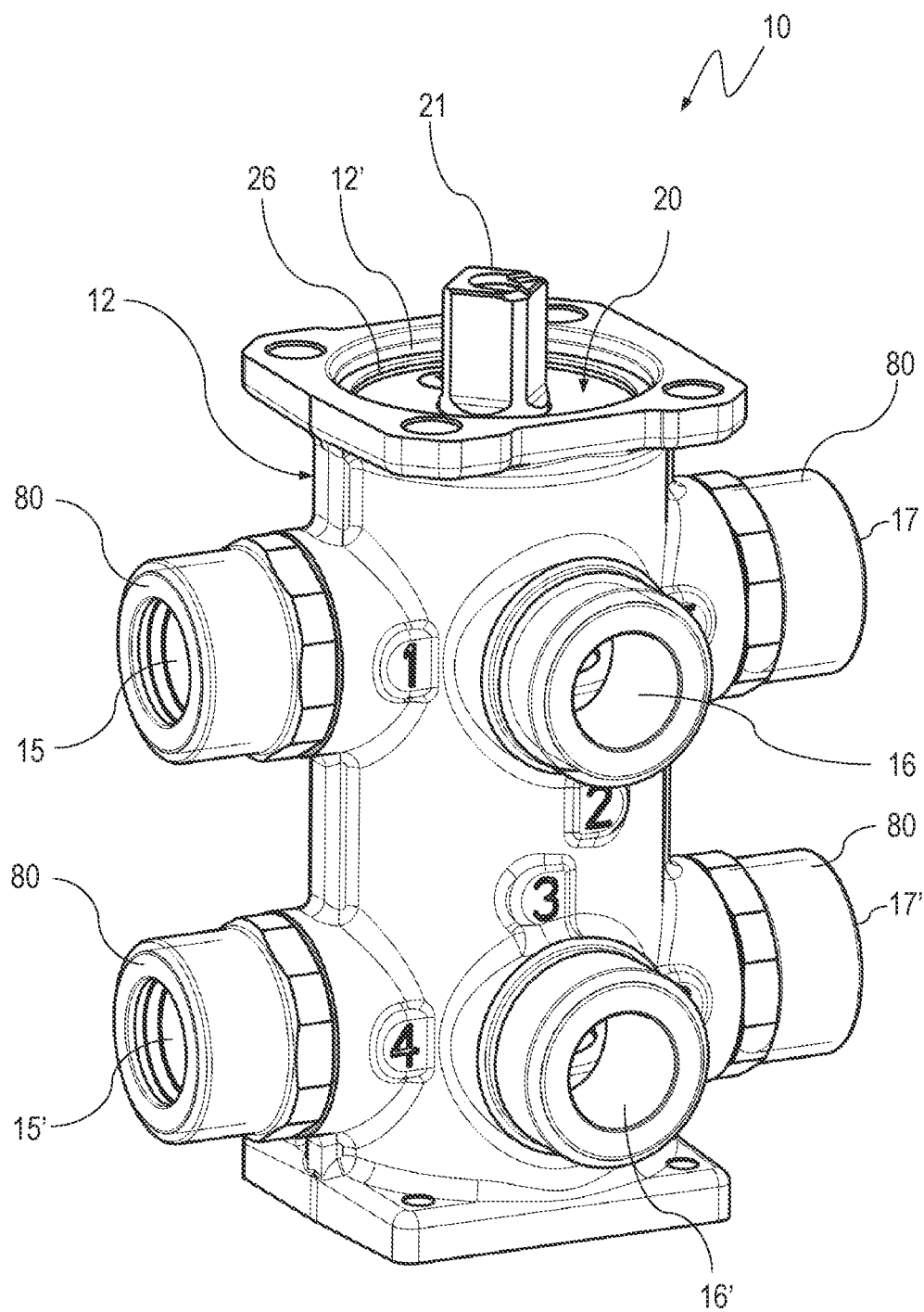
FIG. 2 is a schematic illustration of an overall axonometric view of the same embodiment of the multiway valve with cartridge and fluid mechanics inserts object of the present invention.
Figure 4:
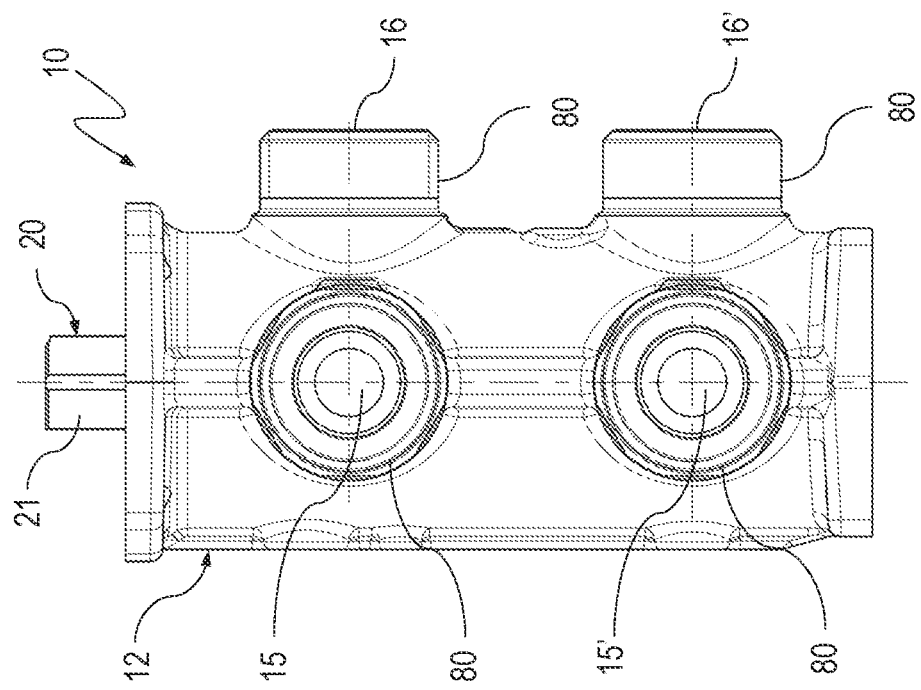
FIG. 4 is a schematic illustration of a side view of the same embodiment of the multiway valve with cartridge and fluid mechanics inserts object of the present invention.
Figure 3:
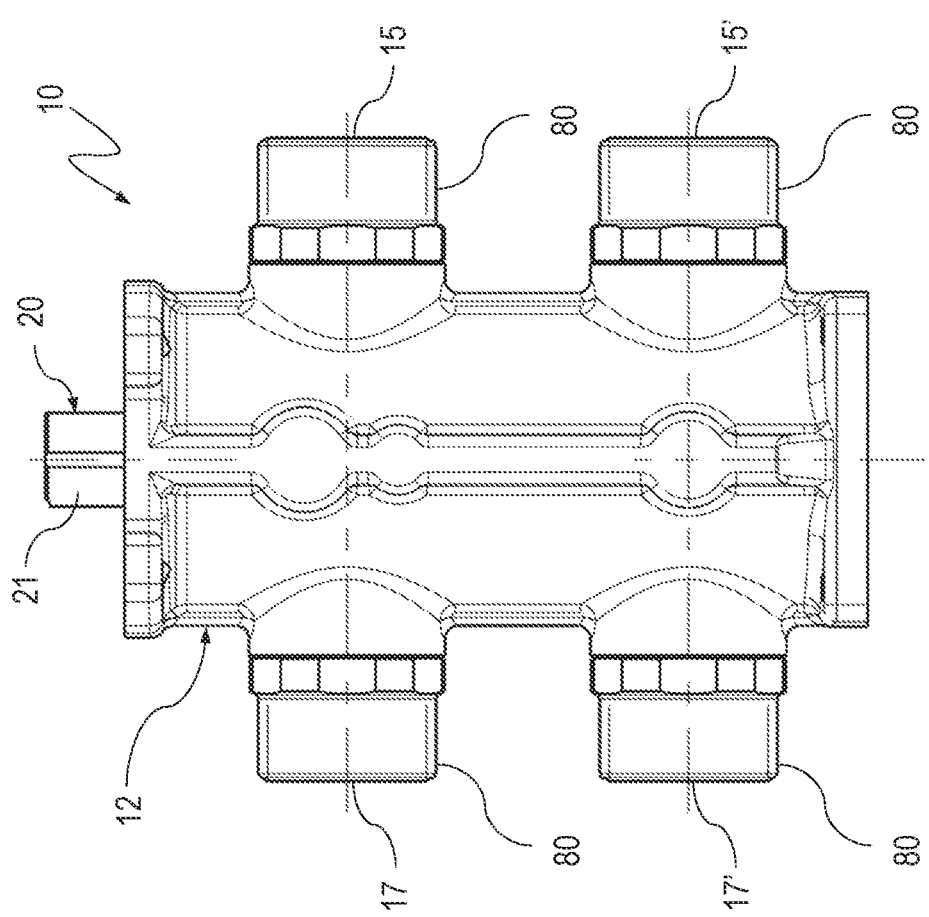
FIG. 3 is a schematic illustration of a front view of the same embodiment of the multiway valve with cartridge and fluid mechanics inserts object of the present invention.

Firstly, it is made reference to Figures from 1 to 4, which show the multiway valve with cartridge and fluid mechanics inserts, generally indicated by reference number 10, and comprising:

- a generally cylindrical shaped hollow valve body 12 having at least one handling opening 12' communicating with the outside and made at an end of the valve body 12 itself and generally blind at the opposite end;
- a plurality of through openings or ways made on the outer wall 13 of said valve body 12 and defining a first group of connecting openings and a second group of connecting openings, said first and second groups of openings being formed at different levels with respect to the longitudinal axis of the valve body 12 itself;
- a handling element or cartridge 30, generally having a tubular shape open at the ends 30', 30" which is internally partitioned by a partitioning transversal septum 31, said cartridge 30 being rotatively disposed in said valve body 12 and comprising at least two first through radial openings 32 made on the outer wall of the cartridge itself.

Figure 5:
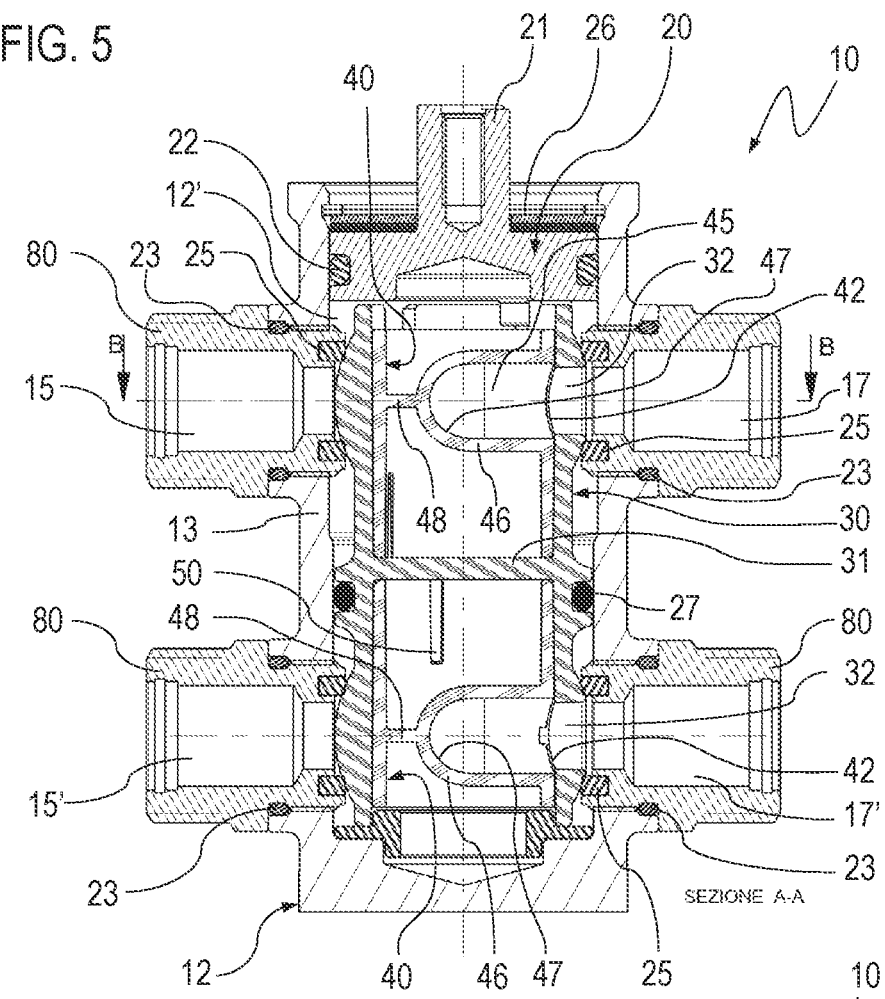
FIG. 5 is a schematic illustration of a cross-section longitudinal view along a plane A-A of the same embodiment of the multiway valve with cartridge and fluid mechanics inserts object of the present invention.
Figure 6:
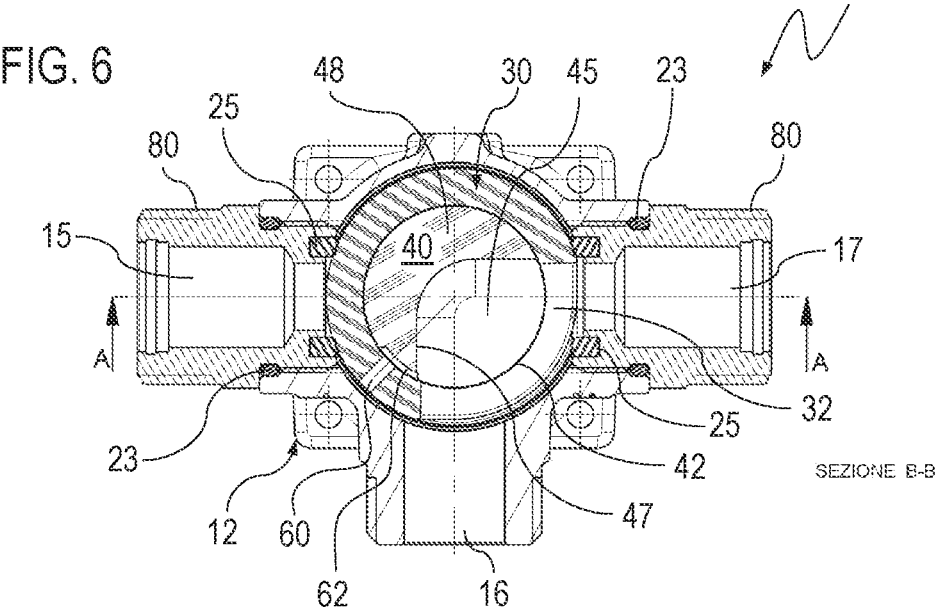
FIG. 6 is a schematic illustration of a cross-section view along a plane B-B of the same embodiment of the multiway valve with cartridge and fluid mechanics inserts object of the present invention.

Still referring to FIG. 1 and particularly to FIGS. 5 and 6, the improvement of the multiway valve 10 of the present invention consists of comprising at least one fluid mechanics insert 40, coaxially housed inside said cartridge 30, operating as a shutter, said fluid mechanics insert having a tubular shape open at the ends and being provided with a second radial opening 42 made on the outer surface and adapted to control the fluid flow, said fluid mechanics insert further comprising a cell 45 made inside the cavity of the fluid mechanics insert 40 itself, said cell 45 being delimited by at least one inner wall 46 folded on said second radial opening 42 in order to form a hollow inside said fluid mechanics insert 40.

The surface of the inner wall of the cell 45 defines a fluid mechanics surface 47 adapted to be variably shaped and configured in order to define a homogeneous fluid through cross-section similar to the one of an angled bent connector having substantially the same cross-section of the openings or conduits to be connected, in order to optimize the fluid mechanics efficiency of the multiway valve 10.

Moreover, said cell 45 can comprise at least one rib 48 transversally disposed inside said fluid mechanics insert 40 and joining the inner surface of the same to the inner wall 46 of said cell 45.

In further not shown embodiment variants, the cells 45 can have a shape of the fluid mechanics surface 47 different for the first fluid mechanics insert 40 and also for the second fluid mechanics insert 40'.

In the preferred embodiment of the multiway valve 10 of the figures, said first group of connecting openings comprises a first triad of connecting openings (15, 16, 17) generally formed in the upper portion of the valve body 12 and said second group of connecting openings comprises a second triad of connecting openings (15', 16', 17') generally formed in the lower surface of said valve body 12.

Still in the preferred embodiment of the figures, a first fluid mechanics insert 40 and second fluid mechanics insert 40' are substantially symmetrically inserted inside said cartridge 30, so that each occupies up to about half the inner cavity of said cartridge up to the partitioning septum 31, said first and second fluid mechanics inserts 40 being further adapted to rotate integrally with said cartridge 30, the corresponding second openings 46 being disposed coincident with said first radial openings 32, by keying and orienting means 50, such as a pin slidingly inserted in a recess made in said cartridge 30 and said fluid mechanics insert 40.

In a simplified embodiment, said cartridge 30 and said first and second fluid mechanics inserts 40, 40' can be advantageously made of a lightweight high performance polymeric or thermopolymeric plastic material, but can be made also of other suitable materials, e.g. cast, stamped metal, or e.g. composite materials for example obtained by sintering metal or ceramic powders or also by additive manufacturing metals or 3D printing.

By the known additive manufacturing methods, such as for example 3D printing, stereolithography or other suitable technical manufacturing methods, said first and second fluid mechanics inserts 40, 40' with the cells 45, can be also advantageously directly formed from a single piece with said cartridge 30, wherein the outer surface of the fluid mechanics insert 40, 40' is directly integrated in the inner surface of the cartridge 30 for forming a substantially tubular shaped single element so that the cells 45 are directly formed in the inner cavity of the cartridge 30 at the first radial openings 32.

Referring again to all the Figures from 1 to 6, said multiway valve 10 can further comprise:

- a head 20 closing said handling opening 12' of the valve body 12, provided with handling means 21 configured to be set into rotation by a command lever or actuator, said handling means 21 being pivotally disposed in said valve body 12 and rotatively keyed to said cartridge 30, said head being further capable of comprising at least one sealing element or gasket 22 on the valve body 12 and one or more fixing elements 26, such as elastic safety rings for example Seeger rings or similar;
- a plurality of sleeve connectors 80 attached to said connecting openings 15, 16, 17, 15', 16', 17' and adapted to fluidically connect said openings to fluid delivery and return conduits of a plant or to other hydraulic devices, such as for example known devices for statically and dynamically adjusting and balancing the flow rate of the fluid, said conduits 80 being provided with first sealing elements 23 or gaskets with the valve body 12 and second sealing elements 25 or gaskets with the cartridge 30 or, in general, with diverting members.

Still referring only to FIG. 6, said cartridge 30 can be also oriented towards an intermediate position corresponding to a complete absence of a fluid communication between the connecting openings 15, 16 and 17 (not shown) wherein the cell 45 of the fluid mechanics insert 40, 40' can be oriented, for example, towards a position opposite to said connecting opening 16 and positioned at about 45° with respect to the directions of the connecting openings 15 and 17, in order to obstruct the fluid flow rate in any direction.

Referring particularly to FIGS. 1 and 6, the multiway valve 10 can be advantageously provided with means for discharging the overpressure of the fluid, in which on said cartridge 30 a hole 60 suitable to cooperate with a notch 62 formed on said fluid mechanics insert 40, 40' is made in order to fluidically connect the connecting aperture 16 to the user plant, and the connecting opening 15 or 17 to the thermal sources, preferably with an opening connected to the fluid return conduit towards the source, in order to also ensure in a closed position of the valve, a minimum through aperture enabling to discharge possible overpressures in the user circuit.

Referring particularly only to FIG. 5, said cartridge 30 is generally advantageously provided with a further sealing or fluid separating element or separating gasket 27, disposed between the outer surface of the cartridge 30 itself and inner surface of the valve body 12 in order to isolate possible leakages of thermal contamination from fluids at different temperatures between the triad of the inlet connecting openings and triad of the outlet ones of the user plant. Said separating gasket 27 can be also advantageously fit in a matching annular recess formed on the outer surface of said cartridge 30 in order to prevent the separating seal from axially translating.

The multiway valve 10 with cartridge 30 and fluid mechanics inserts object of the present invention, can advantageously further comprise at least one known device or means (not shown) for statically and dynamically adjusting or balancing the flow rate, and attached in a fluid communication to the connecting openings (15, 16, 17, 15', 16', 17'), preferably at least one of said connecting openings 15, 15' adapted to receive the fluid flow from the thermal source.

Said known static and dynamic adjusting and balancing devices can be advantageously housed in place of the conventional connectors 80 and are typically attached to the valve body 12 by conventional thread-type tight removable fixing means or similar but can be also fixedly placed in the valve body 12 or integrated in the same.

Said known flow rate static and/or dynamic adjusting and balancing devices or means can for example comprise adjusting and balancing devices, such as for example PICV valves (pressure independent control valves) or balancing deformable membrane elements (not shown) adapted to generate a load loss of the fluid flow consequently adjusting the flow rate entering the multiway valve 10.

As an alternative, the flow rate static adjustment or balancing can be obtained by inserting conventional washers or rings, not shown, having a through hole calibrated in order to decrease the through cross-section of the fluid and to generate a concentrated load loss for limiting the allowable maximum flow rate. Said calibrated washers or rings are advantageously placed at the fluid inlet connecting openings, generally between the conduits and sleeves or connecting means of the valve to the plant.

The invention was hereinbefore described with reference to a preferred embodiment thereof, illustrated in the figures, wherein the first and second groups of the connecting openings of the multiway valve 10, in a six-way configuration, define triads of connecting openings 15, 16 and 17 and 15', 16' and 17', substantially placed at 90° from each other. A person skilled in the field will easily understand that the above discussed features and the following described operation can be obviously implemented by other embodiments in which, for example, the connecting openings 15, 16 and 17 and 15', 16' and 17' are placed on respective planes separated from each other by an angle substantially equal to 120°.

The multiway valve 10, object of the present invention, in a further embodiment (not shown) can be also advantageously configured as an "eight way" valve wherein each of the first and second groups of connecting openings comprises four connecting openings made on the outer wall 13 of the valve body and defining a first quartet of connecting openings in the upper portion of the valve and a second quartet of connecting openings in the lower portion of the multiway valve 10 itself, said connecting openings of each quarter being always generally placed at an angle of 90° from each other, so that the handling member or cartridge 30 is capable of connecting, by a further rotation of 90°, the inlet and outlet of the circuit of a further user plant to the same sources at the inlet of the multiway valve 10.

The description of the multiway valve 10 with cartridge and fluid mechanics inserts object of the present invention, enables to understand the operation described in the following.

Referring particularly to FIGS. 5 and 6, the following describes the operation of the multiway valve 10 mainly illustratively referring to the triad formed by the connecting openings 15, 16 and 17, wherein the connecting openings 15, 17 and the corresponding connectors 80, respectively define the fluid inlets from a hot source and cold source, while the connecting opening 16 defines the inlet of the hot or cold fluid carrier into the user circuit.

Operating the handling means 21 by a lever or an actuator (not shown), sets into rotation the cartridge 30 and the first fluid mechanics insert 40 inside the valve body 12 with the cell 45 that, by a rotation of about 90°, fluidically connects via the connecting opening 16, the fluid carrier sources to the user thermal circuit, alternatively, to the connecting opening 15 connected to a hot fluid source or, as shown in FIG. 6, to the connecting opening 17 connected to a cold fluid source.

The cartridge 30, by being made in a single piece, advantageously comprises two diverting members in one, each operating on a triad of connecting apertures and capable of rotating without mechanical angular misalignments and clearances between the diverting members of each triad, despite the presence of wear, corrosion, and stresses determined by the use.

Referring again illustratively to FIGS. 5 and 6, the cell 45 clearly defines, in cooperation with the surface of the inner cavity of the valve body 12, a homogeneous joining duct between the connecting openings 17 and 16 by keeping constant the through cross-section, without abrupt flow rate variations and sharp corners in order to reduce swirls and preventing a noisy operation of the valve and a possible generation of cavitation phenomena.

Making the fluid mechanics inserts 40, 40' of polymeric materials by known molding processes or by additive manufacturing, advantageously enables to obtain complex shapes of the fluid mechanics surface 47 of the cell 45 enabling to vary the size and shape of the through cross-section of the valve in order to modify the fluid mechanics conditions of the confined flow, and consequently enabling to stabilize the motion of the same. Further, the shape of the fluid mechanics surface 47 of the cell can be asymmetric to the flowing direction of the fluid, in order to generate a different load loss if a fluid flows in a preferred direction, in order to for example convey to the connecting opening 16 different flow rates from the connecting openings 15 and 17 independently from the supplying pressure.

Obviously, the above given remarks can be also clearly true, once the necessary changes have been made, for the second fluid mechanics insert 40' and triad formed by the connecting openings 15', 16' and 17', wherein the connecting openings 15', 17' and the respective connectors 80, respectively define the fluid thermal carrier outlets, returning towards the hot source and cold source, while the connecting opening 16' defines the fluid thermal carrier outlet from the user circuit.

In variants of the embodiment, not shown, another shape of the fluid mechanics surface 47 of the cells 45 in the first fluid mechanics insert 40 and second fluid mechanics insert 40', enables to advantageously maintain as much as possible laminar the confined flow entering the user plant, in order to reduce swirls and fluid mechanics instability phenomena enabling, for example, to more precisely quantify the amount of the flowing fluid by arranging, downstream the valve, a flowmeter.

In the "eight way" embodiment variant, the multiway valve 10 can divert the flow to two further connecting openings and can advantageously connect the inlet and outlet of the circuit to a further user plant, such as for example, a hot water thermal exchange circuit for a sanitary use, to the hot source at the inlet of the multiway valve 10, by further rotating the cartridge through an angle of 90°. From hereinbefore, it can be seen that are obvious the advantages of the multiway valve 10 with cartridge and fluid mechanics inserts object of the present invention.

The multiway valve with cartridge and fluid mechanics inserts is particularly advantageous since provides a valve with a greater fluid mechanics efficiency, reduced swirls of the fluid flow, low noise and a reduced probability of cavitation phenomena.

A further advantage of the multiway valve with cartridge and fluid mechanics inserts object of the present invention consists of providing a multiway valve with a higher reliability and adjustment accuracy without mechanical clearances and angular offsets among the diverting members.

A further advantage, also offered by the multiway valve with cartridge and fluid mechanics inserts object of the present invention, is the possibility of making the cartridge and fluid mechanics inserts also of a polymeric plastic material or similar and by molding processes, additive manufacturing or 3D printing capable of making many different arrangements of the cross-section and of the shape of the cell with respect to what is possible to do with the conventional spherical elements of the conventional valves.

While the invention was hereinbefore described referring particularly to a preferred embodiment given in an exemplifying non-limiting way, many modifications and variants will be evident to a person skilled in the art in light of the above given description. Therefore, the present description intends to encompass all the modifications and variants falling into the scope of the following claims.

The invention claimed is:

1. A multiway valve comprising:
   a hollow valve body having a generally cylindrical shape and at least one handling opening;
   a plurality of through openings made on the outer wall of the hollow valve body defining a first group of connecting openings and a second group of connecting openings; and
   a cartridge having a tubular shave and being rotatively disposed in the hollow valve body and comprising at least two first through radial openings made on the outer wall of the cartridge itself, each of the at least two first through radial openings being aligned in series along the length of one side of the cartridge;
   wherein the cartridge comprises at least two tubular shaped fluid mechanics inserts having a tubular shaped opening at each end, and each one of the at least two fluid mechanics inserts having a second radial opening made on the outer surface thereof and being adapted to control the fluid passage;
   wherein each of one the at least two first through radial openings are positioned to be rotatively adjacent to a respective second radial opening of one of the at least two fluid mechanics inserts;
   wherein each one of the at least two fluid mechanics inserts comprises a cell formed inside a cavity of the fluid mechanics insert defining a homogeneous fluid passage to maximize the fluid mechanics efficiency of the multiway valve; and
   wherein each cell is defined by at least one inner wall and the second radial opening of the fluid mechanics insert to form a niche inside the fluid mechanics insert.

2. The multiway valve according to claim 1, wherein said cell comprises at least one rib transversally arranged inside each one of the at least two fluid mechanics inserts, joining an inner surface of the fluid mechanics insert to an inner wall of the cell of the fluid mechanics insert.

3. The multiway valve according to claim 1, wherein an inner surface of an inner wall of the cell defines a fluid mechanics surface adapted to be suitably shaped and fastened for optimizing the fluid mechanics efficiency of the multiway valve.

4. The multiway valve according to claim 1, wherein said cartridge comprises at least one of a metal, plastic polymeric, and thermopolymeric material, or comprises materials obtained by sintering metal or ceramic powders.

5. The multiway valve according to claim 1, wherein said at least two fluid mechanics inserts comprise at least one of a metal, plastic polymeric and thermopolymeric material, or comprises materials obtained by sintering metal or ceramic powders, or comprises materials obtained by additive manufacturing and 3D printing.

6. The multiway valve according to claim 1, wherein said at least two fluid mechanics inserts are formed with said cartridge as a single monolithic piece.

7. The multiway valve according to claim 1, further comprising a head closing said handling opening of the hollow valve body, provided with handling means adapted to be set into rotation by a command lever or actuator, said handling means being pivotally disposed in said hollow valve body and rotatively keyed to said cartridge.

8. The multiway valve according to claim 1, further comprising a plurality of connectors attached to said connecting openings, wherein the plurality of connectors are adapted to fluidically connect said connecting openings to conduits of a plant.

9. The multiway valve according to claim 1, further comprising a means for relieving overpressure; wherein a hole is positioned through the cartridge to be cooperatively connected to a recess formed on each one of the at least two fluid mechanics inserts to fluidically connect the connecting openings to a user and to fluidically connect the connecting openings to heat sources, to enable relieving overpressures to the user circuit.

10. The multiway valve according to claim 8, wherein said plurality of connectors are provided with first sealing elements or gaskets on the hollow valve body and with second sealing elements on the cartridge or on at least one diverting members.

11. The multiway valve according to claim 1, wherein said cartridge is provided with a separating seal disposed between the outer surface of the cartridge itself and an inner surface of the hollow valve body to isolate possible seepages of a thermal contamination from fluids at different temperatures among the connecting openings.

12. The multiway valve according to claim 1, wherein said first group of connecting openings comprises a first triplet of connecting openings, and wherein said second group of connecting openings comprises a second triplet of connecting openings.

13. The multiway valve according to claim 11, wherein said separating seal is fitted in a matching annular recess formed on the outer surface of said cartridge in order to prevent the separating seal from axially translating.

14. A multiway valve comprising:
  a hollow valve body having a generally cylindrical shape and at least one handling opening;
  a plurality of through openings made on the outer wall of the hollow valve body defining a first group of connecting openings and a second group of connecting openings;
  a cartridge having a generally tubular shape and being rotatively disposed in the hollow valve body and comprising at least two first through radial openings made on the outer wall of the cartridge itself, each of the at least two first through radial openings being aligned in series aloha the length of one side of the cartridge; and
  at least one device for statically/dynamically adjusting and balancing flow rate;
  wherein the at least one device is attached in a fluid communication to at least one of said connecting openings;
  wherein the cartridge comprises at least two tubular shaped fluid mechanics inserts having a tubular shaped opening at each end, and each one of the at least two fluid mechanics inserts, having a second radial opening made on the outer surface thereof and being adapted to control the fluid passage;
  wherein each of one the at least two first through radial openings are positioned to be rotatively adjacent to a respective second radial opening of one of the at least two fluid mechanics inserts;
  wherein each one of the at least two fluid mechanics inserts comprises a cell formed inside a cavity of the fluid mechanics insert defining a homogeneous fluid passage to maximize the fluid mechanics efficiency of the multiway valve; and
  wherein each cell is defined by at least one inner wall and the second radial opening of the fluid mechanics insert to form a niche inside the fluid mechanics insert.

* * * * *